United States Patent
Silverman

Patent Number: 5,899,421
Date of Patent: May 4, 1999

[54] STAND FOR A PORTABLE COMPUTER

[75] Inventor: Ira Silverman, Sunnyvale, Calif.

[73] Assignee: Fujitsu Limited, Japan

[21] Appl. No.: 08/619,818

[22] Filed: Mar. 15, 1996

[51] Int. Cl.$^6$ ................................................... A45D 19/04
[52] U.S. Cl. ............................ 248/175; 248/918; 248/924
[58] Field of Search ................................. 248/175, 136, 248/153, 166, 456, 923, 440.1, 918, 924

[56] References Cited

U.S. PATENT DOCUMENTS

| | | | |
|---|---|---|---|
| D. 317,910 | 7/1991 | Hawkins et al. | D14/100 |
| 1,953,527 | 4/1934 | Bentley | 245/80 |
| 3,171,687 | 3/1965 | Jensen | 297/377 |
| 3,376,009 | 4/1968 | Domino | 248/456 |
| 4,467,727 | 8/1984 | Strommer | 108/23 |
| 4,474,352 | 10/1984 | Nishi | 248/923 |
| 4,618,119 | 10/1986 | Powell | 248/456 |
| 4,635,893 | 1/1987 | Nelson | 248/558 |
| 4,657,214 | 4/1987 | Foster | 248/176 |
| 4,717,112 | 1/1988 | Pirkle | 248/918 |
| 4,832,419 | 5/1989 | Mitchell et al. | 248/918 |
| 5,035,393 | 7/1991 | Menaged | 248/456 |
| 5,100,098 | 3/1992 | Hawkins | 248/917 |
| 5,141,196 | 8/1992 | Arnold et al. | 248/456 |
| 5,177,665 | 1/1993 | Frank et al. | 361/380 |
| 5,212,628 | 5/1993 | Bradbury | 361/395 |
| 5,283,714 | 2/1994 | Tsai et al. | 361/683 |
| 5,345,362 | 9/1994 | Winkler | 248/456 |
| 5,362,025 | 11/1994 | Trom et al. | 248/670 |
| 5,419,525 | 5/1995 | Hilton | 248/918 |
| 5,445,266 | 8/1995 | Prete et al. | 206/320 |
| 5,503,361 | 4/1996 | Kan-O et al. | 248/668 |
| 5,552,957 | 9/1996 | Brown et al. | 361/683 |
| 5,607,135 | 3/1997 | Yamada | 248/456 |

FOREIGN PATENT DOCUMENTS

738853 A2  10/1996  European Pat. Off. .

*Primary Examiner*—Leslie A. Braun
*Assistant Examiner*—Kimberly T. Wood
*Attorney, Agent, or Firm*—Skjerven, Morrill, MacPherson, Franklin & Friel LLP; Norman R. Klivans

[57] ABSTRACT

A desk stand for a hand-held computer allows both variation in viewing angles of the computer display, and the ability to connect the computer to external, peripheral devices. The stand allows clearance for the computer to mate with a docking port which in turn connects to peripheral devices such as a modem or a printer. Thus, the capabilities of the computer are greatly expanded. In addition the computer can be positioned on the stand to allow easier access to its input tablet. Thus, both right-handed and left-handed persons can position the computer so that data entry is more convenient. Moreover, the computer can be positioned in a manner that reduces glare on the computer display unit.

8 Claims, 10 Drawing Sheets

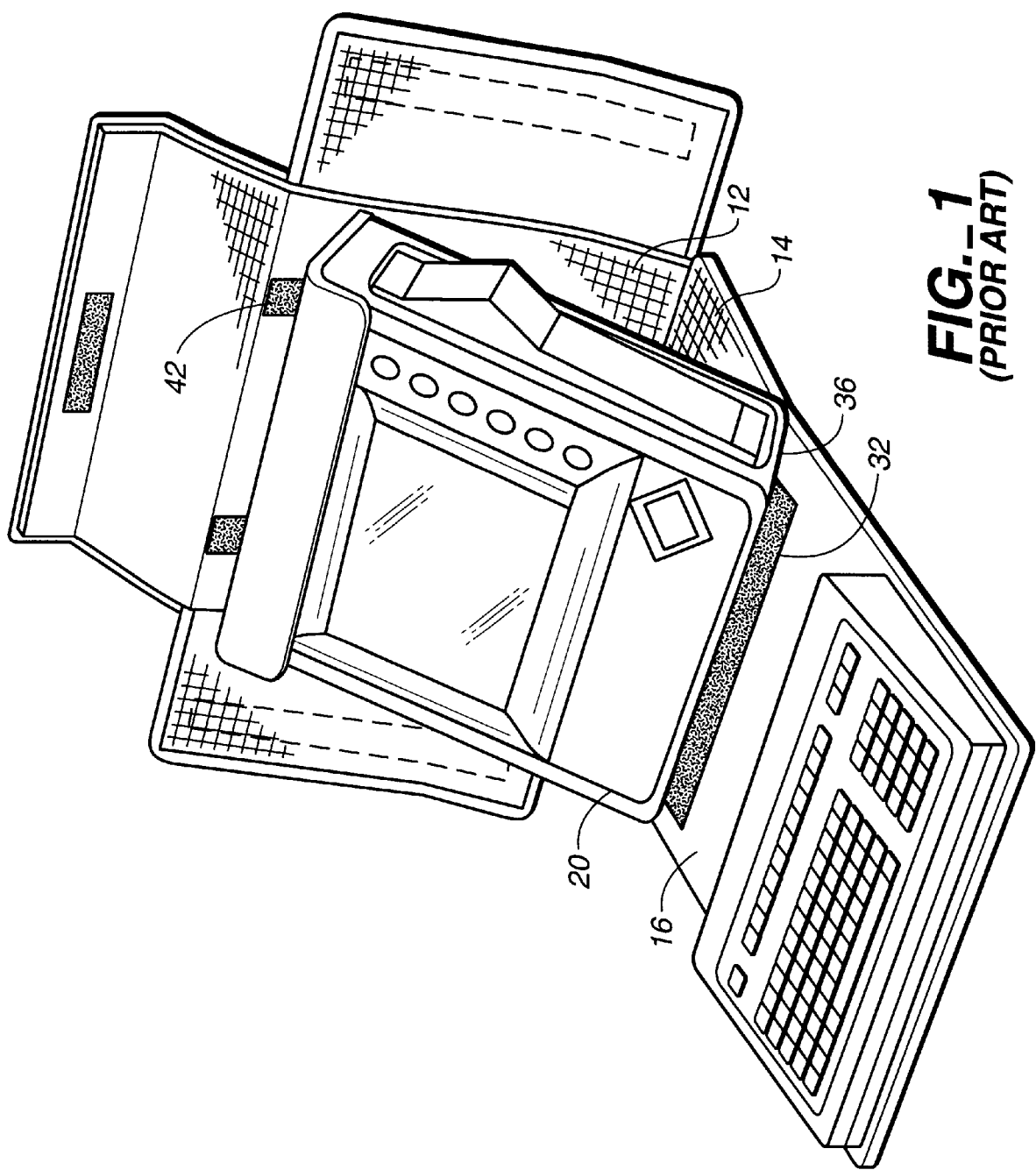
FIG._1
(PRIOR ART)

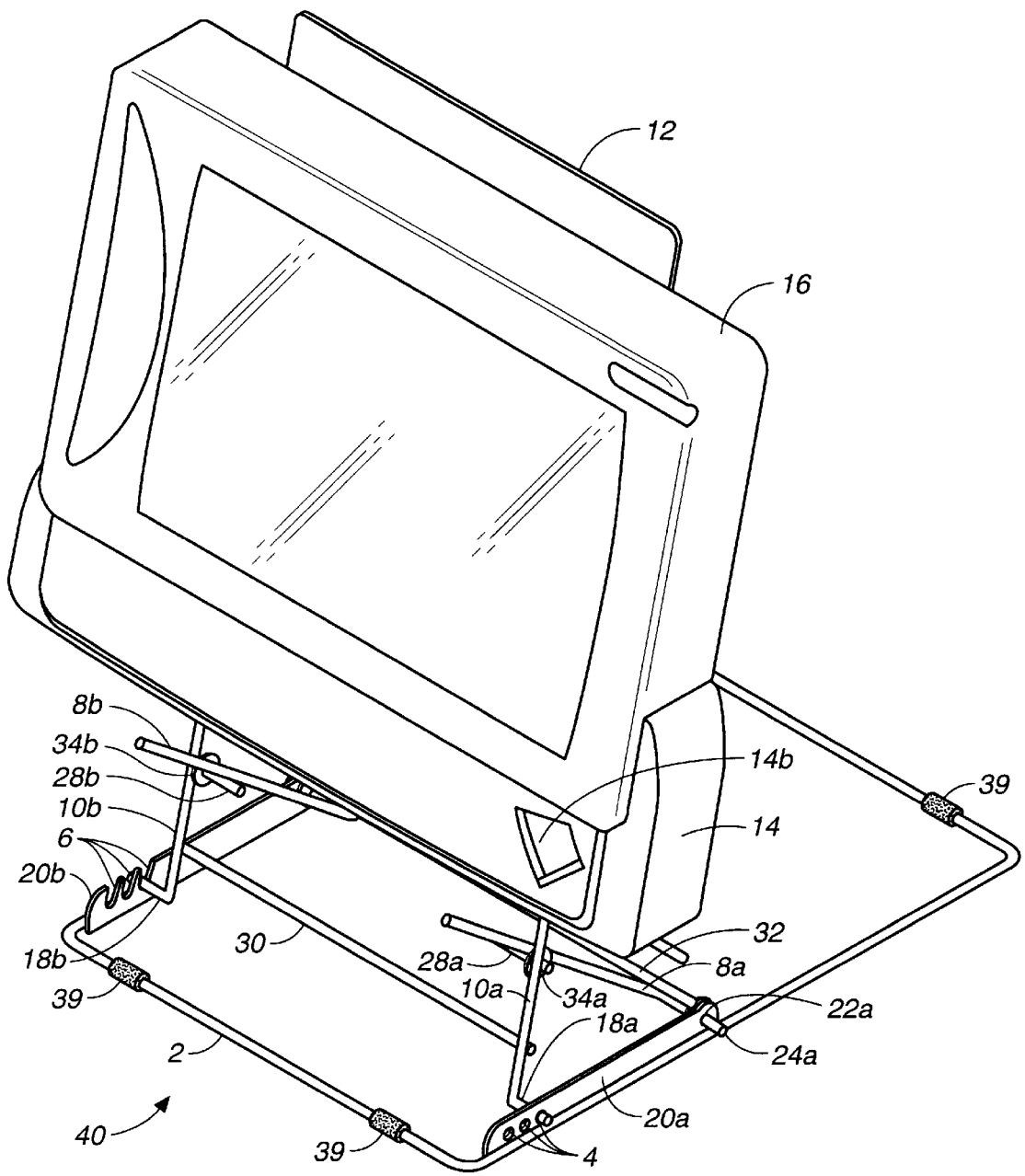
FIG._2

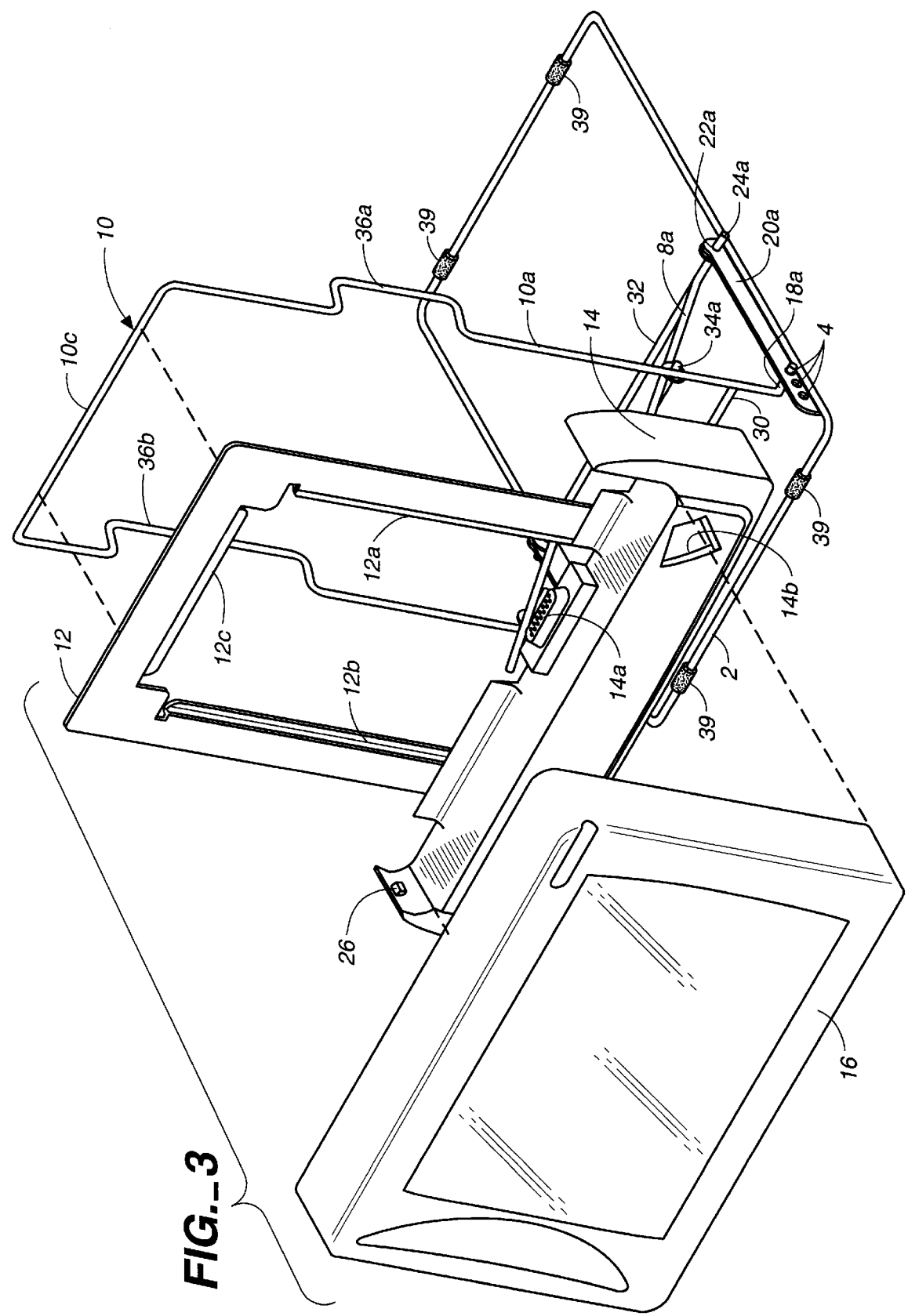
FIG._3

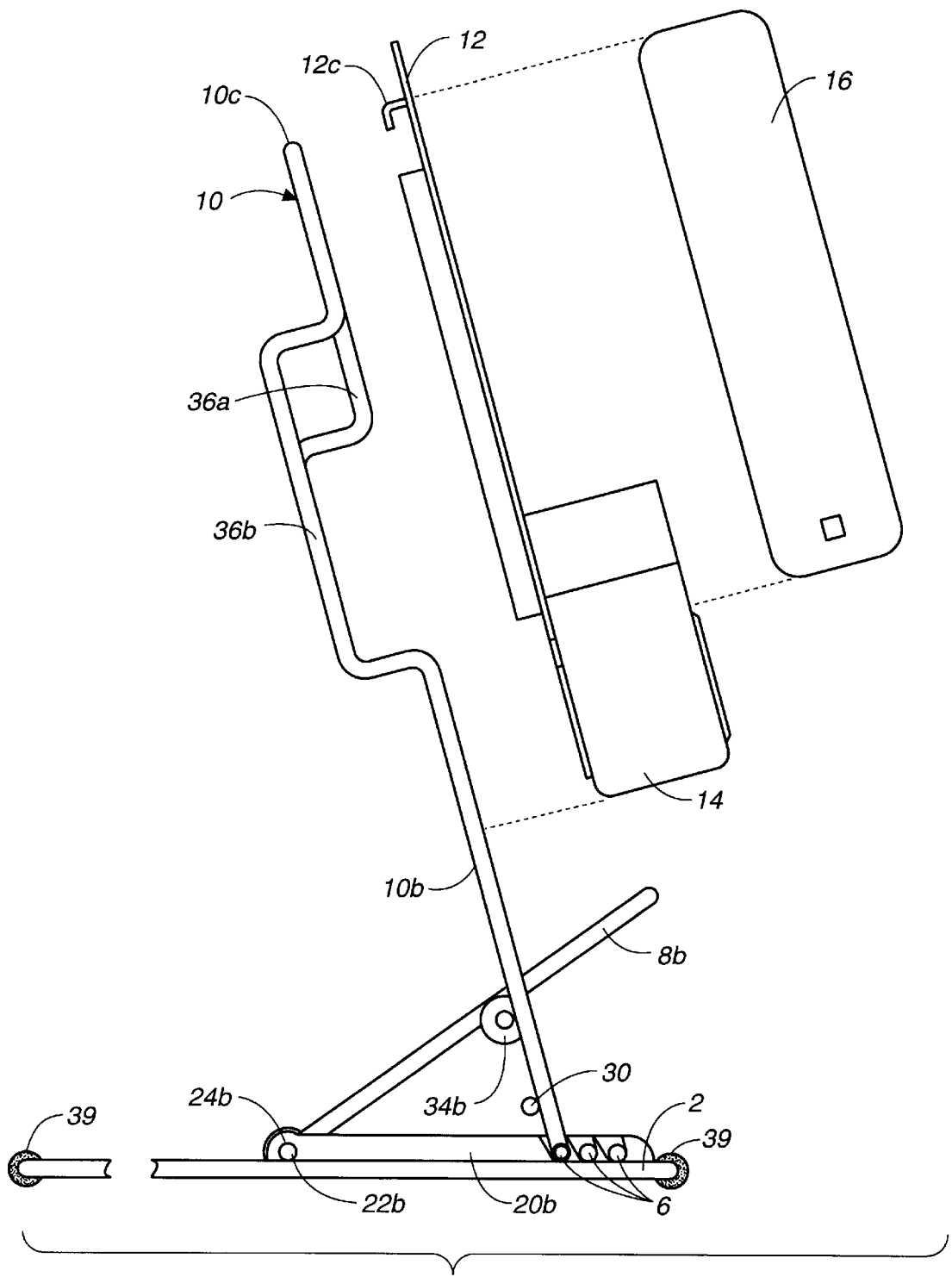
FIG._4

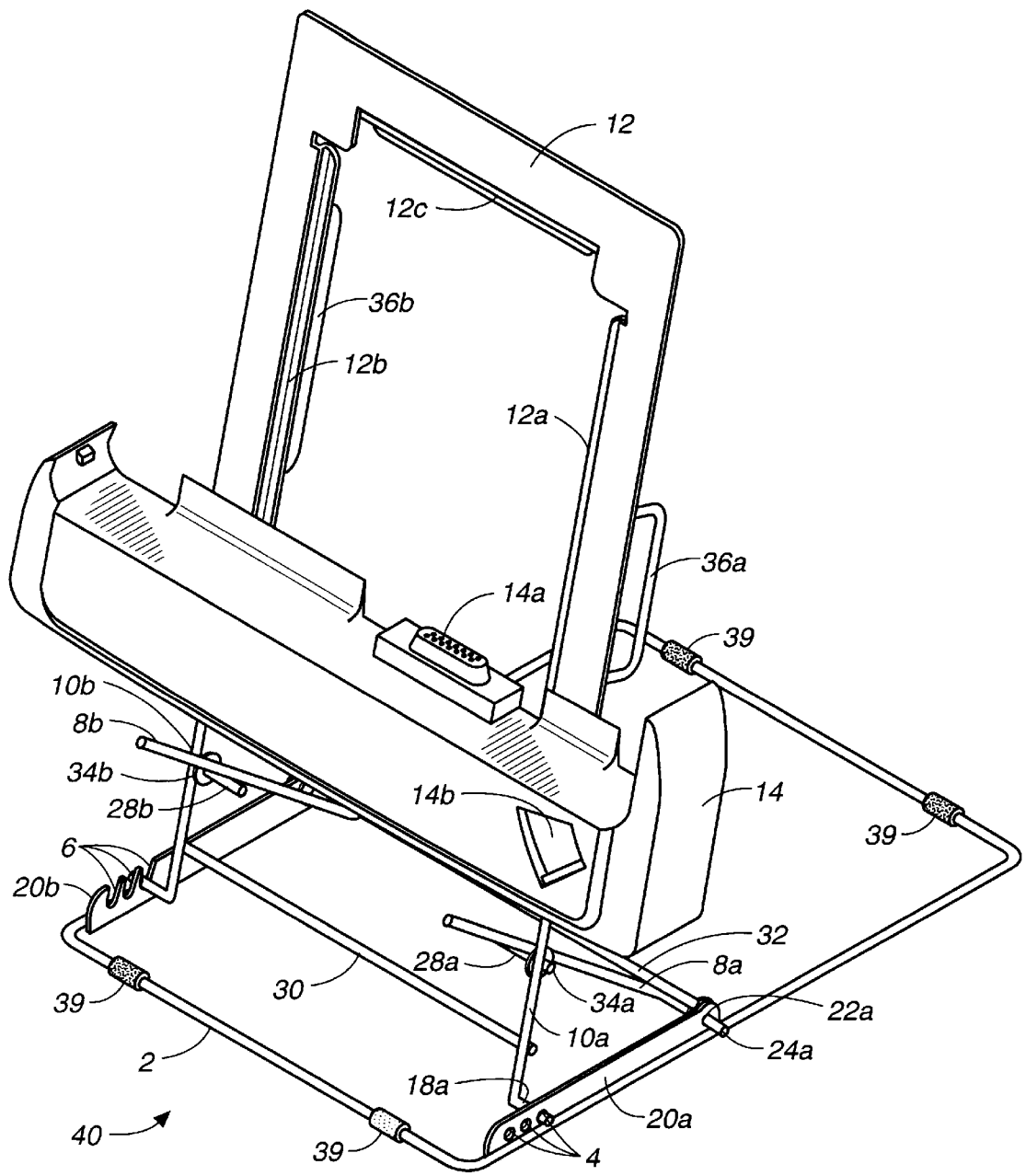
FIG._5

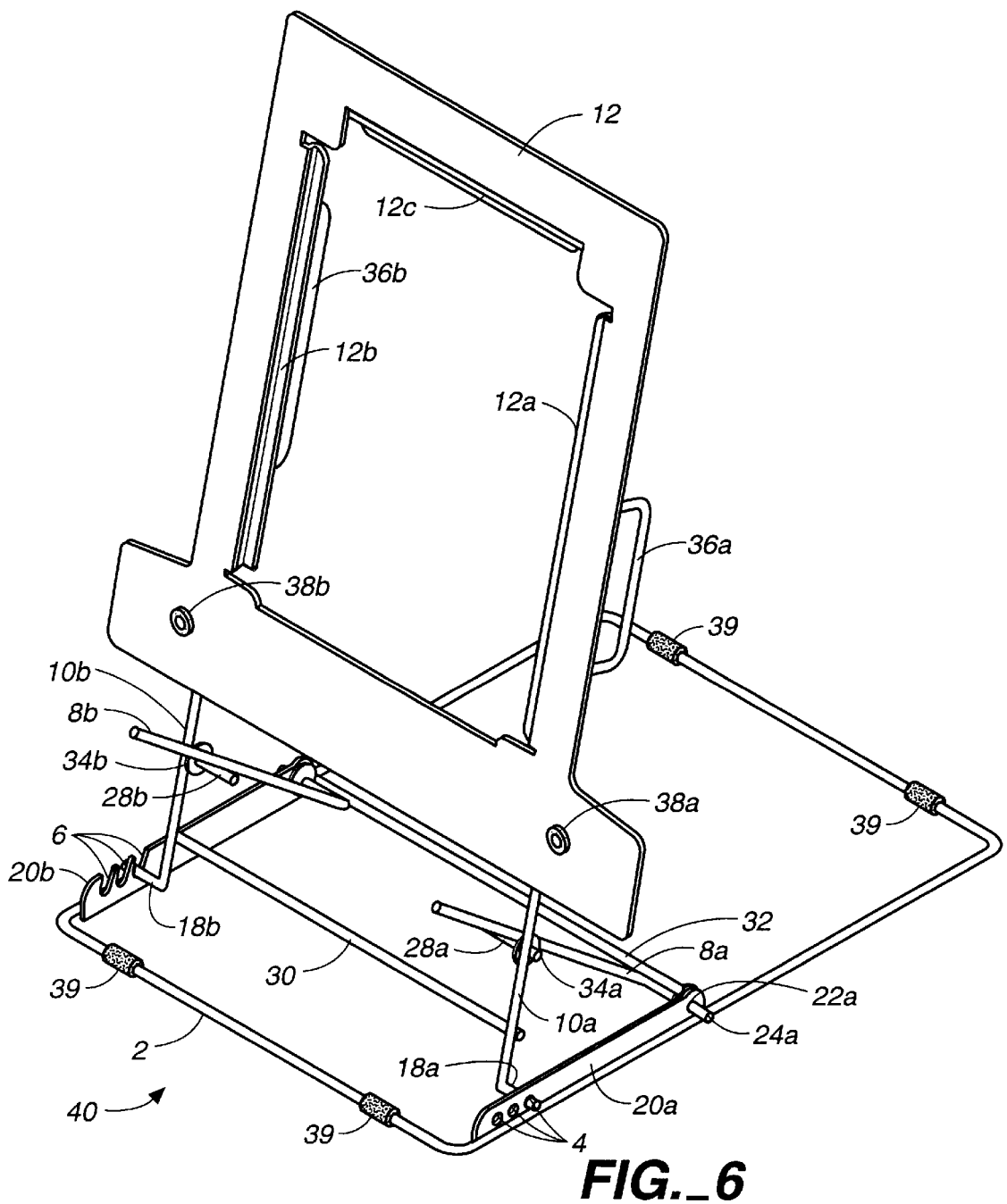
FIG._6

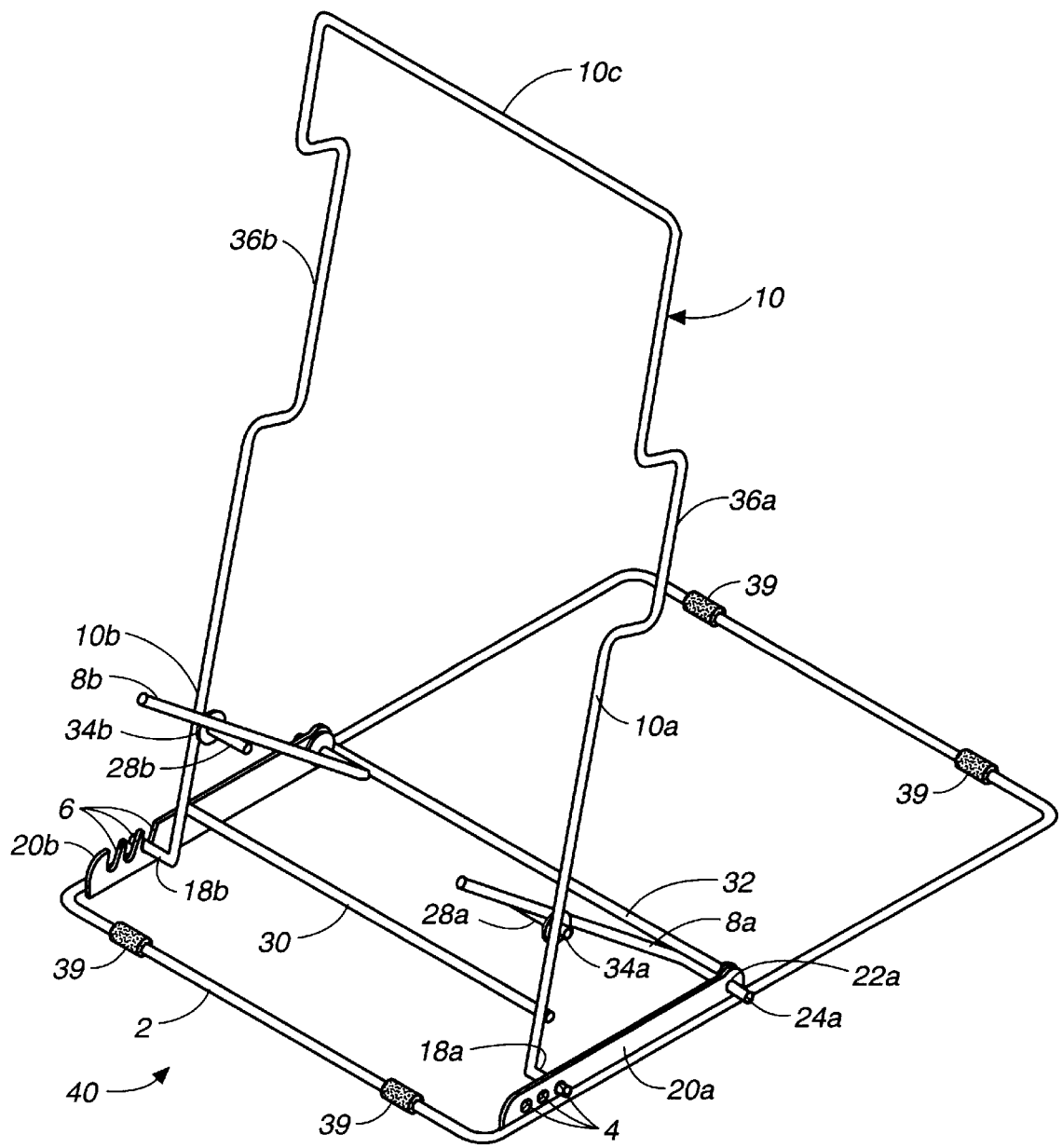
FIG._7

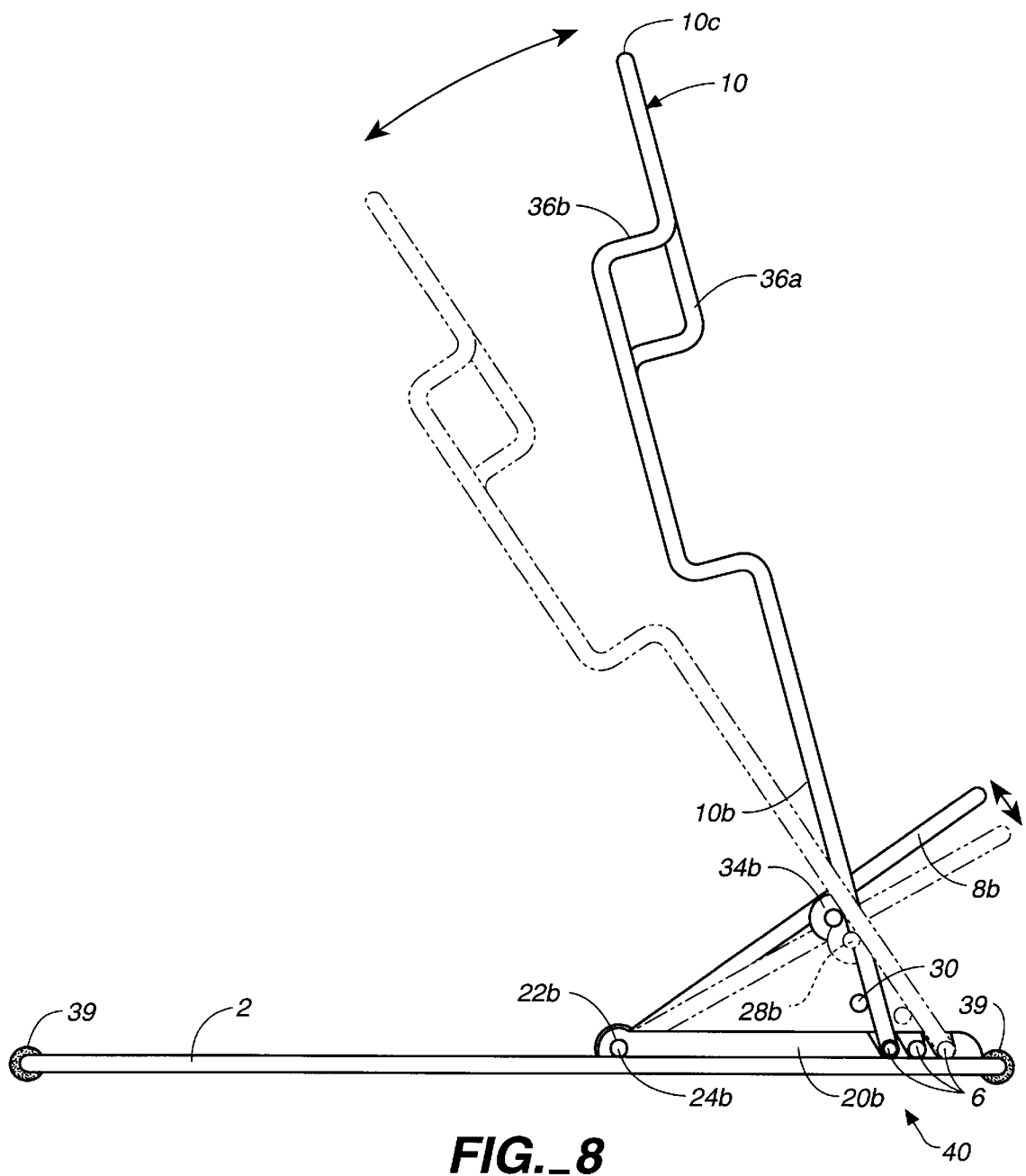
FIG._8

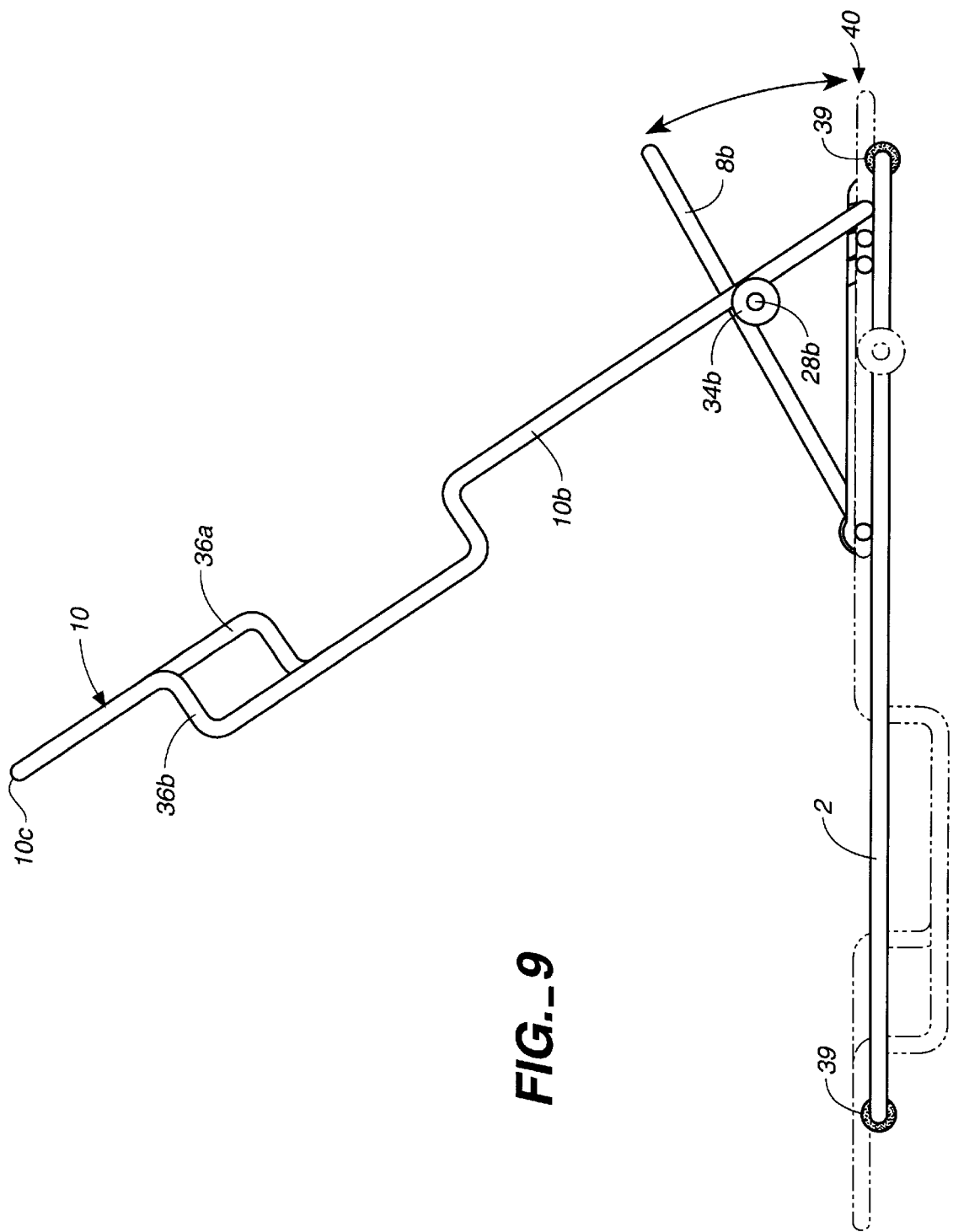
FIG._9

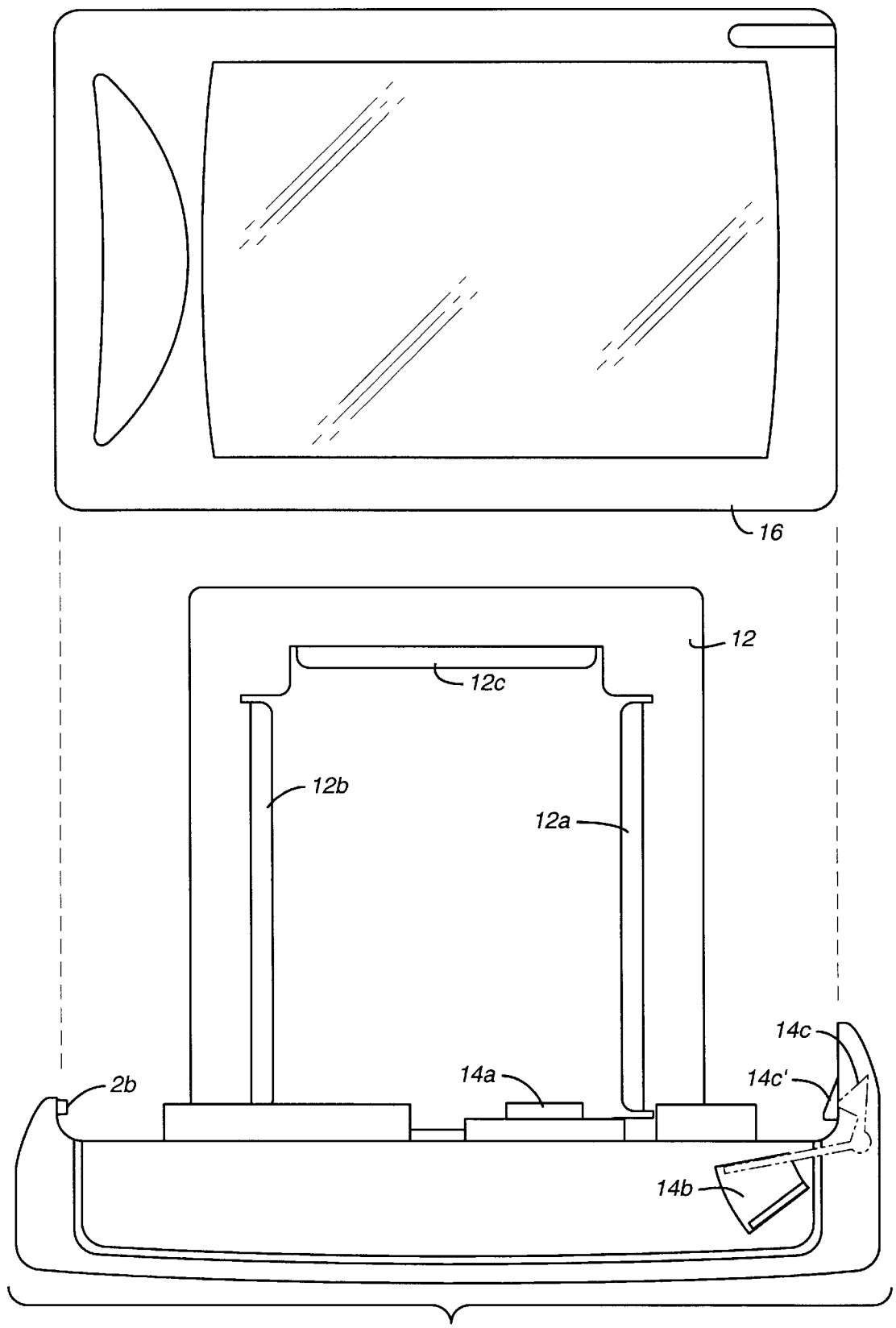
FIG._10

STAND FOR A PORTABLE COMPUTER

BACKGROUND OF THE INVENTION

1. Field of the Invention

This invention relates to portable computers; in particular, this invention relates to a stand that allows a hand-held computer to be propped up for the user's convenience to view the computer display and to be easily connected to peripheral devices.

2. Description of the Prior Art

The need for computer stands has long been apparent. Such stands allow computer displays to be adjusted to accommodate the user's height and viewing angle. Furthermore, stands allow computers to be adjusted in position to accommodate cables that connect the computer to other devices, and thus allow computers to be located apart from the display. For this reason, stands permit office space to be used more efficiently and computers used ergonomically.

In the past, computer stands have been developed both for desk-top computers (as distinguished from lap-top computers), which can interface with external peripheral devices, and for pen-based computers. Lap-top computers as a rule do not require a stand since the display is designed to be adjustable in terms of angle. Computer stands for desk-top computers are bulky and, in order to allow connections to external devices, are often merely horizontal platforms which can rotate in only one plane. The stands for the pen-based computers allow more movement, but either to better protect the computer or to allow the computer to be carried about easily, these stands employ designs which typically do not allow the computer to be connected to external peripheral devices.

Pen-based computers are portable computers which allow for information input by e.g. a light or electromagnetic pen to, respectively, a light- or electomagnetically-sensitive tablet. Their small size renders them portable, but does not allow inclusion of a keyboard. Their advantage lies in their ability to quickly input data, and for this reason they have become popular with salesmen, technicians, and delivery personnel. An example of a commercially available pen-based computer is the Stylistic 1000 from Fujitsu Personal Systems, Incorporated. Pen-based computers are generally held in the user's hand or strapped to the user's arm. They are planar devices: when not held in the hand, they generally lie flat upon a surface. Thus, because the user must position himself almost directly over the display to see it, viewing is difficult when the computer is lying on a surface. Accordingly, stands for these computers have been developed to prop the computer up to make viewing easier.

For example, Prete et al. U.S. Pat. No. 5,445,266 describes a pen-based carrying case which doubles as a computer stand. FIG. 1 of Prete et al., also FIG. 1 herein, depicts a pen-based computer 20 whose viewing angle may be adjusted by tilting the computer at various angles about its base 36. The computer is supported by the computer carrying case at 12 and 14, and is attached by securing means (in one embodiment this is VELCRO, which is attached to both the computer and the carrying case) at 32 and 42. The carrying case doubles as a stand, and its ends 12, 14, and 16 form a protective covering. This covering makes it difficult to attach other devices to the computer. Furthermore, because the stand uses fastening strips such as VELCRO to angle the computer, it may not easily support a heavier, more powerful computer or a pen-based computer with a port replicator (docking port) that allows it to quickly connect to peripheral devices. Finally, the stand in Prete et al. allows the user to position the computer at only one orientation and only one angle. Such a position may be inconvenient, for example, for a left-handed person when the data-entry portion of the computer display is on the right-hand side; such a position may also be inconvenient when glare from overhead lights shines on one side of the computer display.

SUMMARY

The present invention is directed to a stand for a portable computer (e.g., a pen-based hand-held computer) that both allows the computer to be positioned at various angles and orientations (portrait and landscape) to the user and additionally allows the computer to be connected to external, peripheral devices via a docking port. The present invention remedies the above-described and other shortcomings in prior art computer stands. The present stand thus allows a user to position the computer to view and access the display more efficiently. For example, the present stand allows the user to locate the data entry (tablet) portion of the computer nearer to either the user's left or right hand. In addition, the stand allows a hand-held computer also to be used for desk top purposes. A salesman, once able to only do limited tasks on his hand-held computer can, in accordance with the invention, use his computer as a desk top computer to, e.g., type in and print information, or to communicate with his home office over an external modem.

The present stand is such that a hand-held computer placed on it can be positioned at an optimum (adjustable) viewing angle. The stand includes a horizontal base, which rests on a surface such as a desk; a frame hingedly connected to the base, the computer being hung on the frame which can be propped at various angles relative to the base; and a support which props up the frame relative to the base. The stand folds flat along the hinge so that it can be easily transported. The angle of the support relative to the base determines the viewing angle of the computer on the frame. The support ensures ample clearance between the lower portion of the computer and the base to allow the passage of cables between a docking port, mated to the computer, and external peripheral devices.

In accordance with one embodiment of the invention, an adaptor plate detachably hangs by a flange from the frame; the adaptor plate is mounted to the computer docking port, to which the computer is conventionally mated. The docking port further provides a conventional electrical connection between the computer and external, peripheral devices by cable. The support positions the frame to allow ample clearance between the docking port and the base for the cables.

In accordance with another embodiment of the present invention, there is no adaptor plate; instead the docking port (or the computer itself) includes, on a rear surface, protruding hooks or flanges or equivalent members which thereby allow the computer or docking-port-computer combination to hang from the frame member.

BRIEF DESCRIPTION OF THE DRAWINGS

FIG. 1 shows a prior-art pen-based computer stand.

FIG. 2 shows a hand-held computer mated to a docking port supported by a stand.

FIG. 3 shows an exploded view of the structure of FIG. 2.

FIG. 4 shows a side-view of the structure of FIG. 3.

FIG. 5 shows the structure of FIG. 2 without the computer.

FIG. 6 shows the structure of FIG. 5 without the docking port.

FIG. 7 shows the stand of FIG. 2 by itself.

FIG. 8 shows a side view of the stand of FIG. 7.

FIG. 9 shows the stand of FIG. 7 propped up and in a collapsed position.

FIG. 10 shows the computer detached from the docking port and adaptor plate.

DETAILED DESCRIPTION

FIG. 2 illustrates a hand-held computer 16 supported by a computer stand 40 in accordance with one embodiment of this invention. The lower surface of conventional hand-held computer 16 is mated to a (mostly) conventional docking port 14 which is mounted to an adaptor plate 12 (e.g., by screws) which hangs from a horizontal member of frame 10 (depicted in FIG. 3) of the stand 40. The viewing angle of the computer 16 may be adjusted by inserting the frame leg extension 18a of frame 10 into one of various holes 4, and inserting the opposing frame leg extension 18b of frame 10 into one of the corresponding slots 6 of base 2.

Hole 4 is one of several in hole adjustment plate 20a, a member of base 2. Slot 6 is one of several in slot adjustment plate 20b, also a member of base 2. Other embodiments may substitute a hole adjustment plate similar to hole adjustment plate 20a for slot adjustment plate 20b, and vice-versa. The only requirement is that frame leg extensions 18a and 18b are easily positioned such that the angle of frame 10 relative to base 2 is adjustable. Docking port 14 conventionally allows the computer 16 to attach via cables (not shown) to external, peripheral devices. The docking port includes a release latch 14b, discussed below. Hole adjustment plate 20a further defines a hole 22a in which a support leg 24a of support member 8a is inserted. (A similar hole 22b, not shown in FIG. 2, is defined in slot adjustment plate 20b and in which a support leg 24b of support member 8b is inserted.). When frame leg extension 18a is moved between holes 4 in hole adjustment plate 20a and frame leg extension 18b, between slots 6 in slot adjustment plate 20b, support legs 24a and 24b rotate in holes 22a and 22b (as shown in FIG. 8), thus changing the angle of frame 10 relative to base 2; thereby the viewing angle of computer 16 is altered. Supports 8a and 8b are rigidly attached e.g. by welds to pivot pins 28a and 28b, respectively, which pivot about pivot points on frame legs 10a and 10b, respectively. Washers 34a and 34b may be placed on the pivot pins 28a and 28b to ensure that the pins rotate smoothly about the frame legs 10a and 10b; the location of these washers is not critical. The triangle formed by support 8a, frame leg 10a, and hole adjustment plate 20a (with opposite members, 8b, 10b, and 20b) provides a rigid support for frame 10, and thus the adaptor plate 12 and computer 16. The location of the pivot pins and the lengths of the members are chosen so that the area enclosed by base 2 is minimized and the weight of computer 16 is directed between the supports 8a and 8b and thus increases the stability of the assembled stand 40.

Stiffener 30 ensures that frame legs 10a and 10b are spaced rigidly apart (while still allowing sufficient flexibility for frame legs 10a and 10b to be bent and thus frame leg extensions 18a and 18b to be inserted into and out of holes 4 and slots 6). Similarly, stiffener 32 attaches to supports 8a and 8b and ensures that they are rigidly spaced apart and held firmly against frame legs 10a and 10b in order to configure the support triangle; because the frame legs 10a and 10b are attached to each other, they can be moved in unison for easy adjustment. Feet 39 ensure that stand 40 neither slips on nor scratches the surface it rests on.

As depicted here, the base, frame, and support are made of heavy gauge wire. Other embodiments may use other materials and configurations, including metal or plastic plates with cutouts, the requirement being that they support a hand-held computer and its associated attachments.

FIG. 3 depicts an exploded view of FIG. 2 with computer 16 removed from docking port 14 and adaptor plate 12 removed from frame 10. FIG. 3 depicts reliefs 36a and 36b on the frame which, as discussed below, allow the stand to accommodate a computer with handles on its rear surface. FIG. 4 is a side view of the structure of FIG. 3.

Hand-held computer 16 is of a generally-available commercial type such as the above-mentioned Stylistic 1000 from Fujitsu Personal Systems, Incorporated. Docking port 14 is also of a generally-available commercial type such as the Stylistic 1000 Port Replicator with the below-described modifications.

FIG. 5 depicts the structure of FIG. 2, but without the computer 16. FIG. 5 thus more clearly shows the adaptor plate 12 to which is attached docking port 14. In this embodiment, adaptor plate 12 includes flange 12c which hangs on the upper horizontal portion 10c of frame 10 as shown in FIG. 4. Adaptor plate 12 has similar flanges 12a and 12b on the perimeter of its opening, which allow it to be hung from the horizontal portion 10c of frame 10 in either a portrait or landscape orientation of the display of computer 16. This is only one configuration of the adaptor plate; other configurations are possible, allowing the plate to hang in a variety of positions on the frame 10. Adaptor plate 12 is made of e.g. sheet metal or plastic.

FIG. 5 further shows docking port 14, which is attached by e.g. screws (not shown) to adaptor plate 12 at holes 38a and 38b (as shown in FIG. 6), and which conventionally includes an electrical connector 14a and spring-loaded quick-release latch 14b. (The docking port 14 is altered from its commercially available version by inclusion in its rear surface of suitable screw holes or other fastening devices for mounting to adaptor plate 12.). In this embodiment connector 14a connects computer 16 (not shown here) to external, peripheral devices (not shown) such as a modem, keyboard, printer, or external memory. (The surface of the docking port 14 opposite the connector 14a conventionally includes other connectors which attach to cables routed to the external devices. These cables pass through the area between parallel supporting members 8a and 8b.). Connector 14a is a standard computer data connector with sufficient pins to support connections to peripheral devices. When the release latch 14b is in the "engage" (normal) position, the corresponding computer 16 port connector (not shown), which allows signals to be exchanged between the computer 16 and external devices, is securely mated to the connector 14a. In this position, a protrusion connected to the release latch 14b, shown in FIG. 10 at 14c', inserts into a female receptacle on one side of the computer 16 (not shown) to hold the computer 16 firmly to the docking port 14. A fixed protrusion 26 on the opposite side of the docking port 14 inserts into a female receptacle on the opposite side of the computer 16 (not shown) to further hold the computer 16 to the docking port 14. When the release latch 14b is in the "release" position (i.e., the user presses the release latch 14b), the protrusion on the release latch 14b, shown in phantom in FIG. 10 as 14c, is disengaged from the female receptacle on the computer 16 (not shown).

FIG. 7 illustrates the stand 40 without the docking port or adaptor plate. This figure illustrates the horizontal member 10c on which the adaptor plate 12 flange hangs. (In this embodiment frame 10 includes reliefs at 36a and 36b so that the stand 40 can accommodate computers with different-sized handles on their rear portion. Modifications to accommodate other variations of computer handles or other attachments to the computer are also within this invention.). The versatility of frame 10 allows the viewing angle to be adjusted by easily flexing the frame leg extensions 18a, 18b and inserting them into various holes 4 and corresponding slots 6. These adjustments are depicted in phantom view in FIG. 8, which depicts a side view of the stand 40 with the frame 10 at various angles to the base 2.

FIG. 9 depicts the stand 40 in an open position, and, in a phantom view in a collapsed (folded) position.

FIG. 10 (which does not show the stand) illustrates in a partially exploded view the docking port 14 attached to the adaptor plate 12, and how the computer 16 mates to the docking port 14.

Although the present invention has been described with reference to particular embodiments, the description is exemplary only and not limiting. Various adaptations and combinations of features of the embodiments disclosed will be apparent to those skilled in the art and are within the scope of the present invention as defined by the following claims.

I claim:

1. An apparatus for supporting a portable computer comprising:

a base;

a frame hinged to the base;

a support in contact with the base and frame thereby to prop the frame at an angle to the base; and a portable computer docking port adaptor having a portion to hang on an upper part of the frame and having mountings to secure thereto the portable computer docking port wherein the base includes a first adjustment plate, which accommodates a first leg extension of the frame, and a second adjustment plate, which accommodates a second leg extension of the frame, whereby a location of the first leg extension in the first adjustment plate and the second leg extension in the second adjustment plate defines the angle of the frame to the base;

wherein in a collapsed position the base, frame, and support lie flat.

2. The apparatus of claim 1, wherein the support comprises two parallel, spaced-apart members, one connected to each side of the base and each side of the frame.

3. The apparatus of claim 1, wherein the base, frame, and support are of wire.

4. The apparatus of claim 1, wherein the base, frame, and support are of metal.

5. The apparatus of claim 1, wherein the base, frame, and support are of plastic.

6. The apparatus of claim 1, wherein one surface of the adaptor attaches using the mountings to the docking port and an opposite surface defines at least one flange for hanging on the upper part of the frame.

7. An apparatus for supporting a portable computer, comprising:

a base;

a frame hinged to the base;

a support in contact with the base and frame thereby to prop the frame at an angle to the base; and a portable computer docking port adaptor having a portion to hang on an upper part of the frame and having mountings to secure thereto the portable computer docking port wherein the base includes a first adjustment plate, which accommodates a first leg extension of the frame, and a second adjustment plate, which accommodates a second leg extension of the frame, whereby a location of the first leg extension in the first adjustment plate and the second leg extension in the second adjustment plate defines the angle of the frame to the base, wherein the support includes two portions, and one support portion intersects the base at one fixed pivot point at a rear of the first adjustment plate, and a second support portion intersects the base at another fixed pivot point at a rear of the second adjustment plate, such that the center of gravity of the frame and the adaptor plate together lies above the base.

8. An apparatus for supporting a portable computer, comprising:

a base;

a frame hinged to the base;

a support in contact with the base and frame thereby to prop the frame at an angle to the base; and an adaptor having a portion to hang on an upper part of the frame and having mountings to secure thereto a docking port for the portable computer, wherein the base includes a first adjustment plate, which accommodates a first leg extension of the frame, and a second adjustment plate, which accommodates a second leg extension of the frame, whereby a location of the first leg extension in the first adjustment plate and the second leg extension in the second adjustment plate defines the angle of the frame to the base;

wherein the support includes two portions, and one support portion intersects the base at one fixed pivot point at a rear of the first adjustment plate, and a second support portion intersects the base at another fixed pivot point at a rear of the second adjustment plate, such that the center of gravity of the frame and the adaptor plate together lies above the base.

* * * * *